United States Patent Office 3,803,216
Patented Apr. 9, 1974

3,803,216
SUBSTITUTED PHENOXY- AND PHENYLTHIO-ALKYL ACETATES AND ALKANE(DI)THIO-ACETATES
Eric R. Larsen, Lennon H. McKendry, and Fred Y. Edamura, Midland, Mich., assignors to The Dow Chemical Company, Midland, Mich.
No Drawing. Filed Feb. 1, 1971, Ser. No. 111,687
Int. Cl. C07c 69/14, 69/24, 79/34, 153/07
U.S. Cl. 260—488 CD                7 Claims

ABSTRACT OF THE DISCLOSURE

Novel substituted phenoxy- and phenylthio-alkyl acetates and alkane thioacetates corresponding to the formula:

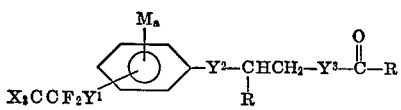

wherein each X independently represents hydrogen, bromo, chloro or fluoro, with the proviso that at least one X is always bromo, chloro or fluoro;
$Y^1$, $Y^2$ and $Y^3$ each independently represents oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
each R independently represents hydrogen or lower alkyl containing from 1 to about 4 carbon atoms, both inclusive.

The compounds of the present invention are suitable for use as herbicides and fungicides.

SUMMARY OF THE INVENTION

The present invention is directed to a novel series of substituted phenoxy- and phenylthio-alkyl acetate and alkane thioacetate compounds corresponding to the following formula:

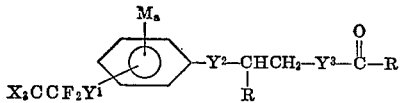

wherein each X independently represents hydrogen, bromo, chloro or fluoro, with the proviso that at least one X is always bromo, chloro or fluoro;
$Y^1$, $Y^2$ and $Y^3$ each independently represents oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
each R independently represents hydrogen or loweralkyl containing from 1 to about 4 carbon atoms, both inclusive.

As used herein, the term "loweralkyl" means saturated, monovalent aliphatic radicals, including straight and branched-chain radicals of from 1 to about 4 carbon atoms, as illustrated by, but not limited to, methyl, ethyl, propyl, isopropyl, butyl, tert.-butyl and the like.

The products of the present invention are oils or crystalline solids at room temperatures having low solubility in water and varying degrees of solubility in many common organic solvents. The compounds of the present invention are suitable for use as herbicides and fungicides.

The compounds of the present invention are prepared by the reaction of a substituted acetate compound corresponding to the formula:

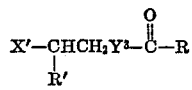

with a substituted phenol or thiophenol compound of the formula:

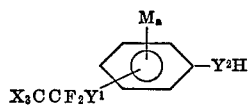

and potassium carbonate in the presence of an inert solvent which serves as a carrier medium. In the above formulas, X, $Y^1$, $Y^2$, $Y^3$, M, $a$, R and R' are as previously defined, and X' represents bromo, chloro or fluoro.

Representative inert solvents operable as carrier media in the present invention include carbon tetrachloride, acetonitrile, dimethylformamide, chloroform, acetone, benzene and the like.

The reaction takes place smoothly at temperatures of from about 0 to about 120° C.; generally, the reaction is carried out at the boiling point of the reaction mixture under reflux conditions. The amount of the reactants employed is not critical, however, a three- to four-fold excess of the substituted acetate reactant is usually employed. The pressure employed is not critical and the reaction is usually carried out at ambient atmospheric pressure.

In carrying out the reaction, the reactants are contacted in any convenient fashion in a carrier medium as described; the resulting reaction mixture is agitated at the boiling point of the reaction mixture under reflux conditions for a period of from about 10 to about 30 hours. Additional portions of the selected substituted acetate reactant are added to the reaction mixture periodically during the course of the reaction. Following the completion of the reaction, the reaction mixture is cooled and filtered, and the carrier medium removed in vacuo to obtain the product as a liquid residue. In certain instances, where partial hydrolysis of the product to the corresponding phenoxyethanol is indicated, the product residue is treated with acetic anhydride at a temperature of from about 100–125° C. for a period of from about one-half to about two hours. The product residue thus obtained can be further purified by employing conventional techniques, such as, for example, distillation, vapor phase chromatography and the like.

The desirable properties of the products of the present invention are inherent in the pure compounds; when highly selective properties are to be relied upon, the purified compounds will be preferred. However, for many applications, incompletely purified products can be utilized if desired.

DESCRIPTION OF THE PREFERRED EMBODIMENTS

The following examples illustrate the present invention but as such are not to be construed as limiting the same.

Example 1

A reaction mixture consisting of 3-(2,2-dichloro-1,1-difluoroethoxy)phenol (10.0 grams; 0.04 mole), 2-bromoethyl acetate (10.0 grams; 0.06 mole), potassium carbonate (13.8 grams; 0.1 mole) and 40 milliliters of acetonitrile was heated at the boiling point under reflux conditions with agitation for a period of about 16 hours. Additional 2-bromoethyl acetate (7.4 grams; 0.04 mole) was added and the reaction mixture was refluxed for an additional one hour period. Following the completion of the reaction, the reaction mixture was cooled and filtered, and the acetonitrile solvent removed in vacuo to obtain the product as a liquid residue. Nuclear magnetic resonance of the product residue indicated partial hydrolysis of the product to the corresponding phenoxyethanol product and the residue was treated with acetic anhydride (3 milliliters) at a temperature of about 115° C. for a period of about one-half hour. Distillation of the product residue gave the desired 2-(3-(2,2-dichloro-1,1-difluoroethoxy)phenoxy)ethyl acetate product as a colorless oil having a boiling point of 136° C. at 0.1 millimeters of Hg.

In view of the foregoing teachings and in a manner similar to that described in Example 1, there are obtained, inter alia, the following substituted phenoxy- and phenylthio-alkylacetate and alkane thioacetate compounds by the reaction of the corresponding substituted acetate and phenol or thiophenol reactants.

| Ex. No. | Name of product | Identifying characteristic of product |
|---|---|---|
| 2 | 2-(4-(2,2-dichloro-1,1-difluoroethoxy)phenoxy)ethyl acetate. | B.P.[1] 134° C. at 0.1 mm. Hg. |
| 3 | 2-(2-(2,2-dichloro-1,1-difluoroethoxy)phenoxy)ethyl acetate. | B.P. 118-120° C. at 0.04 mm. Hg. |
| 4 | 2-(4-(2,2-dichloro-1,1-difluoroethoxy)-2-nitrophenoxy)ethyl acetate. | B.P. 175-180° C. at 0.1 mm. Hg. |
| 5 | 2-(2-chloro-5-(2,2-dichloro-1,1-difluoroethoxy)phenoxy)ethyl acetate. | B.P. 146-148° C. at 0.1 mm. Hg. |
| 6 | 2-(2,4,6-trichloro-3-(2,2-dichloro-1,1-difluoroethoxy)phenoxy)ethyl acetate. | B.P. 144-146° C. at 0.075 mm. Hg. |
| 7 | 2-(2-bromo-5-(2,2-dibromo-1,1-difluoroethylthio)phenylthio)ethyl thiobutyrate. | M.W.[2] 572.7. |
| 8 | 2-(5-(2,2,2-trichloro-1,1-difluoroethoxy)-2-fluorophenoxy)ethyl thioacetate. | M.W. 378.5. |
| 9 | 2-(5-(2,2,2-tribromo-1,1-difluoroethoxy)-2-iodophenoxy)ethyl formate. | M.W. 608.6. |
| 10 | 2-(5-(2,2,2,1,1-pentafluoroethylthio)-2-tert.-butylphenoxy)ethyl propionate. | M.W. 400.0. |
| 11 | 2-(2-(2-bromo-1,1,2-trifluoroethoxy)-3,5-diiodophenoxy)butyl propionate. | M.W. 657.7. |
| 12 | 2-(3-bromo-5-chloro-2-(2,2-dibromo-1,1-difluoroethylthio)phenoxy)ethyl acetate. | M.W. 515.2. |
| 13 | 2-(2-(2-bromo-1,1,2-trifluoroethylthio)-3,5-difluorophenylthio)-3,3-dimethylbutyl thioacetate. | M.W. 497.9. |
| 14 | 2-(4-bromo-5-(2,2-dichloro-1,1-difluoroethoxy)-2,6-dinitrophenoxy)-3,3-dimethylbutyl butyrate. | M.W. 581.9. |
| 15 | 2-(2-(2,2-dichloro-1,1-difluoroethoxy)-3-iodo-5-nitrophenylthio)ethyl acetate. | M.W. 515.9. |
| 16 | 2-(2-bromo-4-chloro-5-(2-bromo-1,1,2-trifluoroethylthio)-6-fluorophenylthio)ethyl isoamyl acetate. | M.W. 562.3. |
| 17 | 2-(5-(2,2-dichloro-1,1-difluoroethoxy)-2,4,6-triiodophenylthio)ethyl thioacetate. | M.W. 738.7. |
| 18 | 2-(4-(2,2-dibromo-1,1-difluoroethoxy)-2,6-difluorophenoxy)ethyl propionate. | M.W. 467.8. |
| 19 | 2-(2,6-dichloro-4-(2,2-dibromo-1,1-difluoroethoxy)phenoxy)-3,3'-dimethylbutyl acetate. | M.W. 542.8. |
| 20 | 2-(2-(2,2,2,1,1-pentafluoroethoxy)-3-tert.-butyl-5-nitrophenoxy)ethyl butyrate. | M.W. 433.0. |
| 21 | 2-(2-(2,2-dibromo-1,1-difluoroethoxy)-3,5-dipropylphenoxy)ethyl acetate. | M.W. 501.8. |
| 22 | 2-(5-(2,2-dichloro-1,1-difluoroethoxy)-2,4,6-triethylphenylthio)ethyl acetate. | M.W. 429.0. |
| 23 | 2-(2-(2-bromo-1,1,2-trifluoroethoxy)-3,5-di-tert.-butylphenoxy)isopropyl butyrate. | M.W. 510.9. |
| 24 | 2-(2-(2,2-dibromo-1,1-difluoroethoxy)-3-propyl-5-iodophenylthio)butyl acetate. | M.W. 629.7. |
| 25 | 2-(2-bromo-4-(2,2-dichloro-1,1-difluoroethylthio)-6-ethylphenoxy)ethyl thioacetate. | M.W. 467.9. |
| 26 | 2-(2-chloro-3-(2,2-dibromo-1,1-difluoroethoxy)-5,6-diethylphenylthio)ethyl acetate. | M.W. 524.3. |
| 27 | 2-(2-chloro-5-(2,2-dichloro-1,1-difluoroethoxy)-4-tert.-butyl-6-nitrophenoxy)ethyl acetate. | M.W. 464.5. |

[1] B.P.=Boiling point. [2] M.W.=Molecular weight.

The products of the present invention are suitable for use as herbicides and fungicides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same plants or fungal organisms. The exact concentration of the toxic substituent to be employed in the treating compositions is not critical and may vary considerably provided the plant or fungal organism and/or their respective habitats are contacted with an effective amount of the toxicant. The concentration of the toxicants in liquid compositions generally is from about 1.0 to about 50 percent by weight. Concentrations up to about 95 weight percent are often employed. In dusts or dry formulations, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

In representative operations, each of the 2-(4-(2,2-dichloro-1,1-difluoroethoxy)phenoxy)ethyl acetate, 2-(3-(2,2 - dichloro-1,1-difluoroethoxy)phenoxy)ethyl acetate, 2-(4-(2,2-dichloro - 1,1 - difluoroethoxy)-2-nitrophenoxy) ethyl acetate, and 2-(2-chloro-5-(2,2-dichloro-1,1-difluoroethoxy)phenoxy)ethyl acetate compounds gives complete control of *Trichophyton mentagrophytes* when such organisms are contacted with compositions containing one of the above compounds at a concentration of 500 parts per million by weight.

In additional representative operations, each of the 2-(4-(2,2-dichloro-1,1-difluoroethoxy)phenoxy)ethyl acetate, 2-(2-chloro-5-(2,2 - dichloro - 1,1 - difluoroethoxy)phenoxy)ethyl acetate and 2-(2,4,6-trichloro-3-(2,2,-dichloro-1,1-difluoroethoxy)phenoxy)ethyl acetate compounds gives substantially complete control of downy mildew when such organisms are contacted with compositions containing one of the above compounds at a concentration of 400 parts per million by weight.

In further representative operations, each of the 2-(2-(2,2 - dichloro-1,1-difluoroethoxy)phenoxy)ethyl acetate, 2-(4-(2,2-dichloro - 1,1 - difluoroethoxy)phenoxy)ethyl acetate, 2-(3-(2,2 - dichloro-1,1-difluoroethoxy)phenoxy) ethyl acetate, and 2-(2-chloro-5-(2,2-dichloro-1,1-difluoroethoxy)phenoxy)ethyl acetate compounds gives complete control of pigweeds when such plants are contacted with compositions containing one of the above-named compounds at a dosage rate of 20 pounds per acre.

The substituted haloalkoxy- or haloalkylthio-phenol or thiophenol compounds employed as starting materials in the present invention are prepared by halogenating or nitrating a corresponding unsubstituted haloalkoxy- or haloalkylthio-phenol or thiophenol compound or a lower-alkyl-substituted haloalkoxy- or haloalkylthio-phenol or thiophenol compound.

The addition of the halogenating or nitrating agent is conveniently carried out in the presence of an inert solvent, such as, for example, acetone, carbon tetrachloride, methylene chloride and the like, at temperatures of from about 0 to about 60° C. over a period of from about 10 minutes to about three hours. Ordinarily, a small amount of an actuating agent, e.g., ferric chloride, aluminum chloride, iodine and the like, is incorporated into the reaction mixture in order to decrease reaction time. Following the addition of the halogenating or nitrating agent, the reaction mixture is agitated at ambient temperatures for a period of from about 1 to about 18 hours, filtered, and washed with water, dilute hydrochloric acid, and the like and dried. Evaporation of the reaction mixture under reduced pressure leaves the desired product as a solid or viscous residue which can be further purified by employing conventional techniques.

The unsubstituted haloalkoxy- or haloalkylthiophenol or thiophenol compounds employed in the halogenating and nitrating reactions above can be prepared by known or analogous procedures disclosed in the literature. For example, 3-(2,2-dichloro-1,1-difluoroethoxy)phenol is prepared by the reaction of resorcinol, 1,1-dichloro-2,2-difluoroethylene and potassium hydroxide in the presence of acetone. The 1,1-dichloro-2,2-difluoroethylene reactant is usually sparged into a mixture of the other reactants at a temperature of from about 0 to about 10° C. over a period of about two hours. Following the completion of the reaction, the solvent is removed by evaporation under reduced pressure and the residue thus obtained is dissolved in 10% aqueous potassium hydroxide and subsequently filtered. The aqueous solution is acidified with dilute hydrochloric acid, extracted with carbon tetrachloride and the extract dried over magnesium sulfate. Removal of the carbon tetrachloride solvent by distillation gives the desired 3-(2,2-dichloro-1,1-difluoroethoxy) phenol product as an oil having a boiling point of 108–109° C. at 0.2 millimeter of Hg.

The loweralkyl-substituted haloalkoxy- or haloalkylthio-phenol or thiophenol starting materials are prepared in analogous procedures by reacting a loweralkyl-substituted catechol, resorcinol or hydroquinone compound with a substituted difluoroethylene compound.

The fluoro-substituted or fluoro- and loweralkyl-substituted haloalkoxy- or haloalkylthio-phenol or thiophenol compounds employed in the halogenating and nitrating reactions above are prepared by introducing the fluorine atom into the ring prior to the preparation of the ether. These compounds are prepared from a fluoro- or a fluoro- and loweralkyl-substituted catechol, resorcinol or hydroquinone compound according to the procedures set forth in Illinois State Geological Circular #199, p. 15 (1955). Other modes of substitution are readily arrived at by the synthesis of ortho-, meta-, or para-fluoro-(2,2-dihalo-1,1-difluoroethoxy)benzene compounds from the corresponding fluorophenols followed by nitration, reduction, diazatization, hydrolysis and the like.

The loweralkyl-substituted catechol, resorcinol and hydroquinone compounds and the substituted difluoroethylene compounds employed above in the preparation of starting materials and the substituted acetate compounds employed as starting materials in the present invention can be prepared by known or analogous methods disclosed in the literature or readily obtained from commercial sources.

Compounds containing the $CX_3CF_2Y-$ moiety, wherein X represents bromo or chloro, are readily prepared by photochemically halogenating known compounds of the type

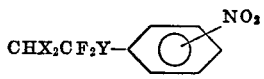

(See Lichtenberger et al., Bull., Soc. Chim. Fr., 4, 581–596 (1957) with an appropriate halogenating agent, such as, for example, $Cl_2$, ClBr and the like, in the presence of a solvent such as carbon tetrachloride or a heterogeneous mixture employing water.)

The compounds wherein X is fluoro are prepared by reacting the compounds wherein X is bromo or chloro with a molten antimony fluoro-chloro compound at a temperature of from about 80–120° C. for a period of from about ½ to about 2 hours.

The resulting halo substituted compounds of the above formula are readily reduced to the corresponding anilines with various reducing agents, such as, for example, zinc-hydrochloric acid, hydrogen-Raney nickel, and the like. The anilines are then reacted with sodium nitrite to form diazonium salts which are readily hydrolyzed to the corresponding phenols or thiophenols.

Secondary substituents on the ring may, depending upon the resistance of the substituent to the succeeding reactions, be introduced at various points in the reaction sequence or introduced after the phenol or thiophenol is obtained.

What is claimed is:

1. Compounds corresponding to the formula

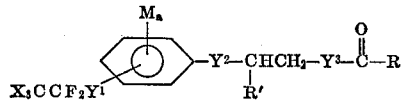

wherein
each X independently represents hydrogen, bromo, chloro or fluoro, with the proviso that at least one X is always bromo, chloro or fluoro;
$Y^1$, $Y^2$ and $Y^3$ each independently represent oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
each R independently represents hydrogen or loweralkyl containing from 1 to about 4 carbon atoms, both inclusive.

2. A compound according to claim 1 which is 2-(4-(2,2-dichloro-1,1-difluoroethoxy)phenoxy)ethyl acetate.

3. A compound according to claim 1 which is 2-(3-(2,2-dichloro-1,1-difluoroethoxy)phenoxy)ethyl acetate.

4. A compound according to claim 1 which is 2-(4-(2,2-dichloro - 1,1 - difluoroethoxy)-2-nitrophenoxy)ethyl acetate.

5. A compound according to claim 1 which is 2-(2-chloro-5-(2,2 - dichloro-1,1-difluoroethoxy)phenoxy)ethyl acetate.

6. A compound according to claim 1 which is 2-(2,4,6-trichloro-3-(2,2-dichloro - 1,1 - difluoroethoxy)phenoxy) ethyl acetate.

7. A compound according to claim 1 which is 2-(2-(2,2-dichloro-1,1-difluoroethoxy)phenoxy)ethyl acetate.

References Cited

Chem. Abstracts, 41:3576f.
Chem. Abstracts, 58:2400y.
Chem. Abstracts, 61:1879e.
Chem. Abstracts, 70:28580h.

VIVIAN GARNET, Primary Examiner

U.S. Cl. X.R.

71—100, 106; 260—455 R, 491, 609 R, 613 D; 424—301, 311